Jan. 19, 1926.                                            1,570,312
                        H. C. MALLORY
          METHOD OF PRODUCING EXPANSIBLE COLLAPSIBLE ELEMENTS
                    Filed August 31, 1920
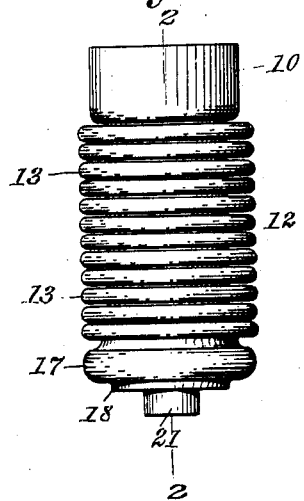
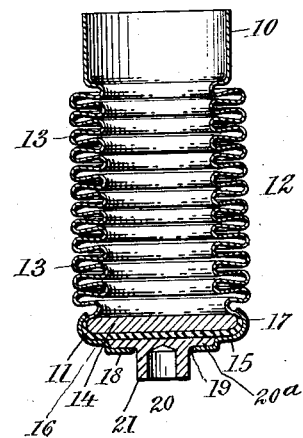
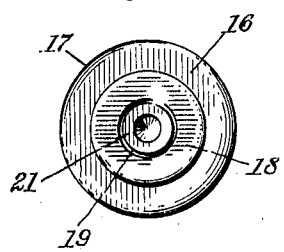
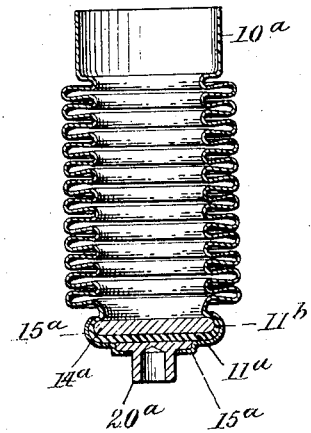
Inventor
Harry C. Mallory
By Conrad A. Willard
his Attorney Patented Jan. 19, 1926.

1,570,312

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

METHOD OF PRODUCING EXPANSIBLE-COLLAPSIBLE ELEMENTS.

Application filed August 31, 1920. Serial No. 407,207.

*To all whom it may concern:*

Be it known that I, HARRY C. MALLORY, a citizen of the United States, residing at Bellport, Suffolk County, in the State of New York, have invented certain new and useful Improvements in Methods of Producing Expansible-Collapsible Elements, of which the following is the full, clear, and exact specification.

My invention relates to elastic elements, and the same has for its object more particularly to provide an elastic metallic element for use in connection with apparatus or devices subject to or influenced by temperature or pressure variations, whereby to operate a valve, apparatus or other mechanism.

Further, said invention has for its object to provide an expansible-collapsible element having a thin metal line, and an end reinforced upon its inner and outer sides whereby to give greater strength and rigidity to said closed end, and to render said element readily attachable to other parts, mechanisms or devices adapted to be operated or controlled thereby.

Further, said invention has for its object to provide an expansible-collapsible element for the purposes specified having one end interiorly and exteriorly reinforced whereby to permit of said closed end being conveniently attached or secured to other parts, mechanisms or devices to be operated by, or in connection with said expansible-collapsible element.

Further, said invention has for its object to provide an expansible-collapsible element having a thin metal line, and an end reinforced upon its inner and outer sides by separate reinforcing members, and attaching means permanently clamped into engagement with said end by the reinforcing member disposed upon the outer side of the end of said element.

Further, said invention has for its object to provide a simple, convenient and inexpensive method of producing an expansible-collapsible element of the character hereinabove specified.

Other objects will in part be obvious, and in part be pointed out hereinafter.

To the attainment of the aforesaid objects and views my invention consists in the novel details of construction, and in the combination, connection and arrangement of parts, and in the several steps constituting the method hereinafter more fully described, and then pointed out in the claims.

In the accompanaying drawings forming part of this specification wherein like numerals of reference indicate like parts, Figure 1 is a side elevation showing one form of expansible-collapsible element constructed according to, and embodying my said invention;

Fig. 2 is a sectional view taken on the line 2—2 of Fig. 1;

Fig. 3 is a bottom view, and

Fig. 4 is a central vertical sectional view showing a modified form.

In producing an expansible-collapsible element embodying the present invention I first form a cylindrical shell 10 having a closed end 11, and then subject the shell to the action of suitable dies whereby to circumferentially corrugate its intermediate or body portion to form a series of corrugations or folds 13. The closed end 11 which in the construction illustrated at Figs. 1, 2 and 3, is of substantially the same diameter as the body portion 12, and is provided upon its inner side with a flat, circular disk 14. The said disk 14 is firmly secured in position by the first corrugation 13 formed in the side of the shell adjacent to the closed end 11.

Hereupon I take a shallow reinforcing cap 15 comprising a base 16 having a vertical flange or rim 17 and a central depressed or recessed portion 18 provided with an aperture 19, and insert into said cap an attaching member 20 provided with a flat, circular base 20ª having a reduced cylindrical portion or boss 21 extending centrally therefrom. The base 20ª of said attaching member is adapted to be receive by the central depressed portion 18 of said cap, with the cylindrical portion or boss 21 thereof extending through the aperture 19 in said cap.

The cap 15 with the attaching member 20 therein is then fitted upon the closed end 11 of the corrugated shell 10, and the flange or rim 17 pressed or rolled firmly into engagement with the outer side of the first corrugation which embraces the reinforcing disk 14, and thus permanently secured thereto. The disk 14 disposed within the closed end 11 of the shell 10, and the cap 15 secured to the outer surface of the first corrugation jointly serve to interiorly and exteriorly reinforce said closed end, and the cap 15, with its attaching portion 20, serve to reinforce materially the closed end 11 of the shell 10, and at the same time said cap secures said attaching member 20 to said shell.

In the modified construction illustrated at Fig. 4, the expansible-collapsible element is constructed essentially as the main construction, as illustrated at Figs. 1 to 3, inclusive. In the modified construction the circumferentially corrugated shell 10ª has its closed end 11ª provided with a reduced portion to form a boss 11ᵇ within which is secured a reinforcing disk 14ª, and upon the outer side of said boss 11ᵇ is secured a cap 15ª, formed like the cap 15, and containing a similar attaching member 20ª.

The attaching member has its projecting portion or boss 21 recessed so as to permit of said boss being interiorly or exteriorly screw-threaded or otherwise prepared for securement or connection with a valve or other element or part to be actuated by or through the corrugated portion of the shell.

This application is a continuation in part of my earlier application filed April 22, 1914, Serial No. 833,593, renewed December 5, 1919, Serial No. 342,802, and patented January 25, 1921, No. 1,366,473.

Having thus described my said invention what I claim and desire to secure by Letters Patent is:

1. The process of making an expansible-collapsible element which consists in forming a shell having a body portion and a closed end, circumferentially corrugating said body portion, disposing reinforcing members within and without said closed end, and then securing said closed end and reinforcing members together, substantially as specified.

2. The process of making an expansible-collapsible element which consists in forming a shell having a body portion, and a closed end, corrugating said body portion, securing a reinforcing member within said closed end, and then securing a reinforcing cap upon the outer side of said closed end, substantially as specified.

3. The process of making an expansible-collapsible element which consists in forming a shell having a body portion, and a closed end, circumferentially corrugating said body portion, securing a reinforcing disk within said closed end, and then securing a reinforcing cap upon the outer side of said closed end, substantially as specified.

4. The process of making an expansible-collapsible element which consists in forming a shell having a body portion and a closed end, circumferentially corrugating said body portion, inserting a flat circular disk into said closed end, constricting the side wall of said shell immediately above said reinforcing disk and then disposing a cup-shaped member upon the outer side of said closed end, and conforming the wall of said cup-shaped member to the portion of the closed end of said shell in engagement with said flat circular disk therein, substantially as specified.

5. The process of making an expansible-collapsible element which consists in forming a shell having a body portion and a closed end, circumferentially corrugating said body portion, inserting a flat circular disk into said closed end, constricting the side wall of said shell immediately above said reinforcing disk, disposing a cup-shaped member having an apertured recess therein upon the outer side of said closed end, and inserting an attaching member within said apertured recess, and then conforming the wall of said cup-shaped member to the portion of the closed end of said shell in engagement with said flat circular disk therein, substantially as specified.

Signed at the city of New York, New York County, in the State of New York, this first day of June, one thousand nine hundred and twenty.

HARRY C. MALLORY.